United States Patent [19]

Hosoda

[11] Patent Number: 4,776,025

[45] Date of Patent: Oct. 4, 1988

[54] NEIGHBOR IMAGE PROCESSING EXCLUSIVE MEMORY

[75] Inventor: Makoto Hosoda, Shizuoka, Japan

[73] Assignee: Hamamatsu Photonics Kabushiki Kaisha, Shizuoka, Japan

[21] Appl. No.: 900,514

[22] Filed: Aug. 26, 1986

[30] Foreign Application Priority Data

Aug. 27, 1985 [JP] Japan .................. 60-187587

[51] Int. Cl.⁴ .............................................. G06K 9/56
[52] U.S. Cl. ........................................ 382/27; 382/41; 382/49; 358/160; 358/166; 358/167; 358/284
[58] Field of Search ............................. 382/27, 41, 49; 358/160, 166, 167, 282, 284

[56] References Cited

U.S. PATENT DOCUMENTS

| | | | |
|---|---|---|---|
| 4,395,698 | 7/1983 | Sternberg et al. | 382/27 |
| 4,641,351 | 3/1987 | Preston, Jr. | 382/27 |
| 4,689,823 | 8/1987 | Wojcik et al. | 382/49 |

Primary Examiner—John W. Shepperd
Assistant Examiner—Michael D. Parker
Attorney, Agent, or Firm—Finnegan, Henderson, Farabow, Garrett and Dunner

[57] ABSTRACT

A neighbor image processing exclusive memory device comprises a data input/output device for supplying and receiving image data; a plurality of memory blocks coupled to the data input/output device for receiving, storing and transmitting neighbor image data via the data input/output device, individual segments of the data having corresponding addresses; and a plurality of address converters coupled to the memory blocks for selectively reading, writing and converting addresses in response to conversion mode signals received from an external source thereof. The converters simultaneously supply the addresses to the memory blocks for simultaneous access to individual segments of the neighbor image data in the memory blocks.

2 Claims, 3 Drawing Sheets

NEIGHBOR IMAGE PROCESSING EXCLUSIVE MEMORY

BACKGROUND OF THE INVENTION

1. Field of the Invention

This invention relates generally to digital image processing, and more particularly to devices used for processing neighbor images.

2. Description of the Prior Art

No memory IC yet has been proposed in the art which, in an image neighbor process, can read the image neighbors at the same time.

That is, heretofore a method generally has been employed in which neighbors (picture elements) are sequentially read out of a single memory, and accumulated in a shift register, so that the neighbors may be obtained simultaneously.

FIG. 3 is a circuit diagram showing one example of a conventional neighbor image processing device.

The conventional device has a plurality of series-connected shift registers, each corresponding to one horizontal line. Image data sequentially read out of the image memory are stored in the shift registers. The data are loaded in a read tap register through the intermediate connecting points of the shift registers, and neighbor data read out in a parallel mode are applied to an arithmetic unit array or the like. Thus, the operation is performed in the manner of a pipe line, to obtain the outputs sequentially or one by one.

The example shows the case of image-processing of 3×3 neighbors.

The sequential outputs thus obtained are written in the image memory so that they may be processed later.

The above-described conventional neighbor image processing device in which neighbors (picture elements) are picked up and processed with the aid of the image memory and the shift registers suffers from the following difficulties:

1. Since the shift registers are fixed in length, it is difficult to vary the configuration of a neighbor region which is selected.

2. Since the image data must be input sequentially, random access is not possible.

3. In order to pick up a larger neighbor region, it is necessary to add hardware.

Accordingly, it is an object of this invention to access neighbor image data randomly rather than sequentially for subsequent processing.

Another object of this invention is to process neighbor image data of varying configurations.

It is a further object of this invention to increase the capacity of a neighbor image processing memory device without the need for significant additional hardware.

Additional objects and advantages will be obvious from the accompanying description, or may be learned by practice of the invention.

SUMMARY OF THE INVENTION

To achieve the foregoing objects and advantages, the neighbor image processing exclusive memory device of the present invention comprises data input/output means for supplying and receiving image data; memory means coupled to the data input/output means for receiving, storing and transmitting neighbor image data via the data input/output means, individual segments of the data having corresponding addresses, and address conversion means coupled to the memory means for selectively reading, writing and converting the addresses in response to conversion mode signals received from an external source thereof, the conversion means for simultaneously supplying the addresses to the memory means for simultaneous access to individual segments of the neighbor image data in the memory means.

Preferably, the memory means includes a plurality of independent memory blocks, and the conversion means includes an individual address converter corresponding to each memory block.

It is also preferred that the address converters and the memory blocks comprise a single integrated circuit substrate.

Each of the address converters preferably includes a conversion table for receiving the conversion mode signal, and a pair of addresses coupled to the conversion table for receiving the output thereof and for receiving the addresses corresponding to the data input into the memory means. Each of the memory blocks preferably comprises a 512×512-bit RAM.

BRIEF DESCRIPTION OF THE DRAWINGS

The accompanying drawings, which constitute a part of the specification, illustrate an embodiment of the invention, and, together with the description, serve to explain the principles of the invention.

Of the drawings.

DETAILED DESCRIPTION OF THE PREFERRED EMBODIMENT

The present preferred embodiment of this invention will be described in detail with reference to the accompanying drawings.

In accordance with the invention, the neighbor image processing exclusive memory device comprises data input/output means for supplying and receiving image data; memory means coupled to the data input/output means for receiving, storing and transmitting neighbor image data via the data input/output means, individual segments of the data having corresponding addresses; and address conversion means coupled to the memory means for selectively reading, writing and converting the addresses in response to conversion mode signals received from an external source thereof, the conversion means for simultaneously supplying the addresses to the memory means for simultaneous access to individual segments of the neighbor image data in the memory means.

Figure 1:
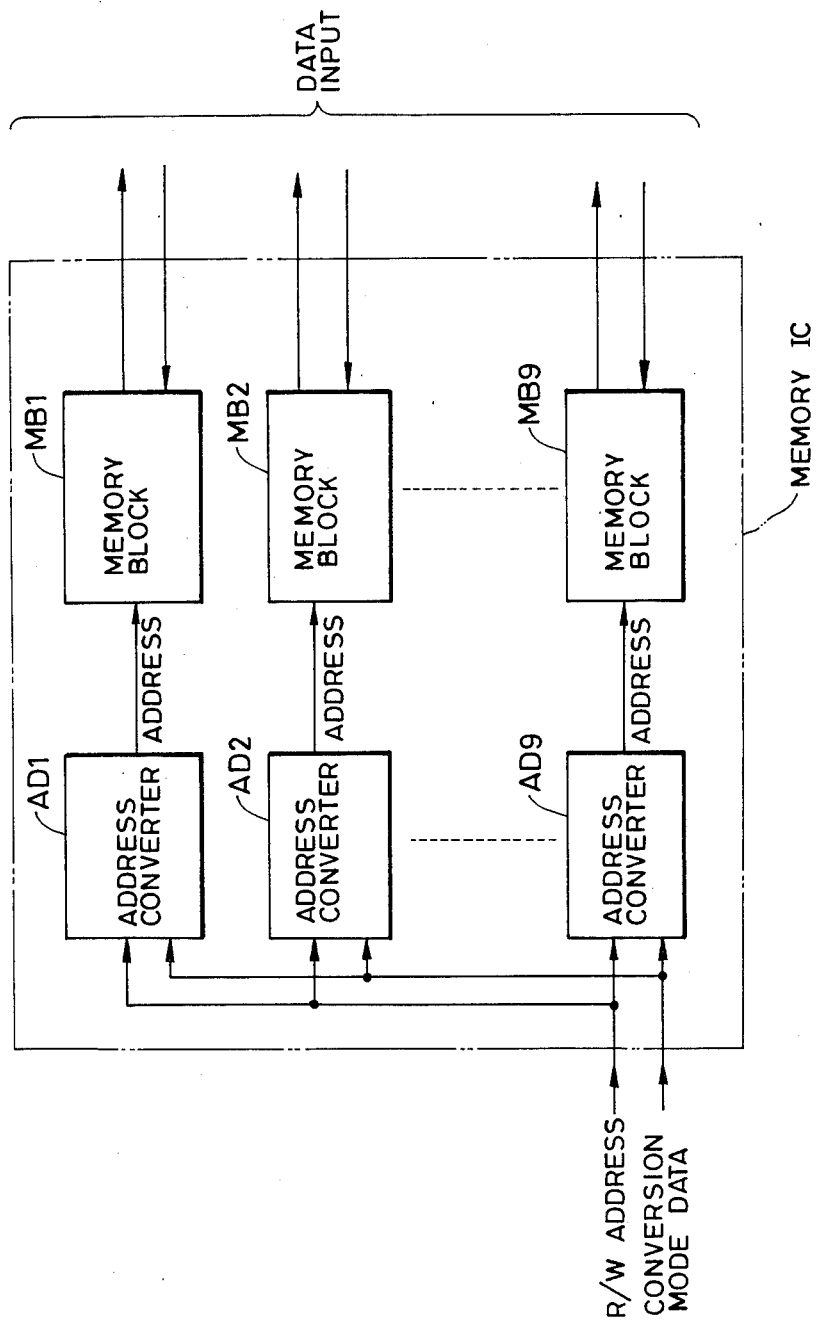
FIG. 1 is a block diagram showing one example of a neighbor image processing exclusive memory according to this invention.

FIG. 1 is a block diagram showing one example of a neighbor image processing exclusive memory according to the invention.

As shown in FIG. 1, address converters AD1 through AD9 are provided in correspondence to memory blocks MB1 through MB9, respectively. Addresses and conversion mode signals are applied to the address converters AD1 through AD9.

Figure 2:
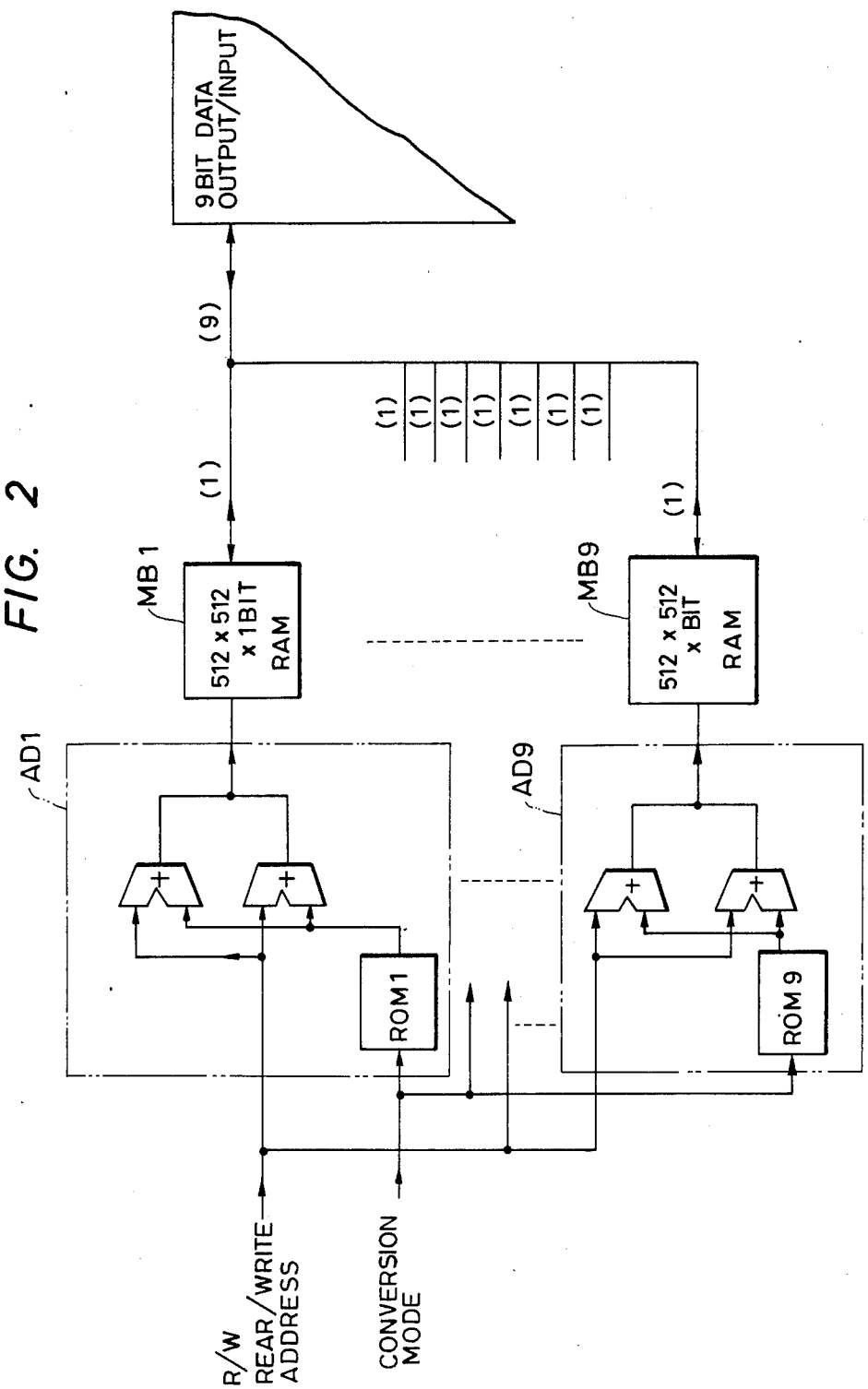
FIG. 2 is a circuit diagram showing a part of the neighbor image processing exclusive memory of FIG. 1.
Figure 3:
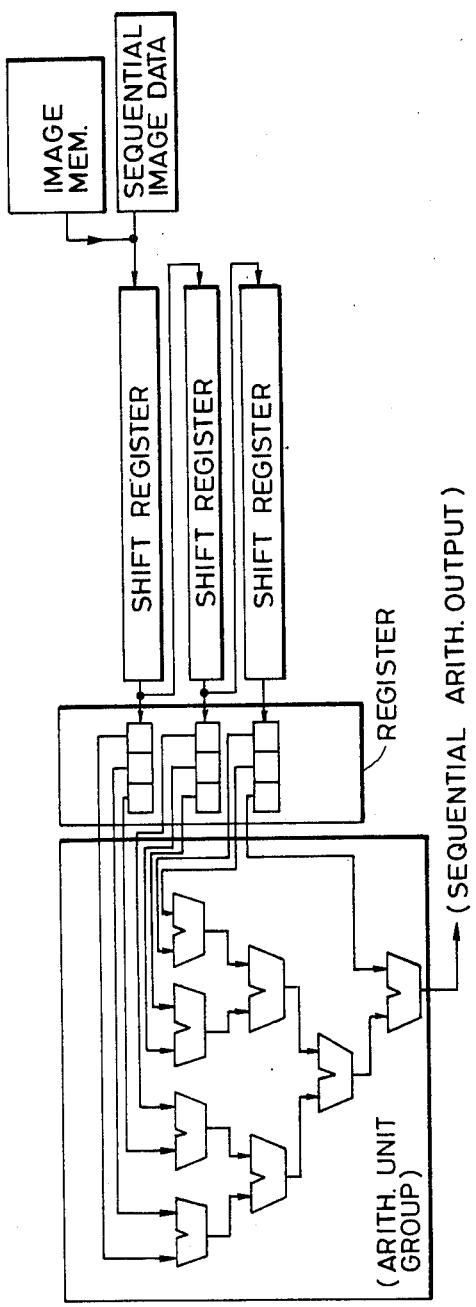
FIG. 3 is a circuit diagram showing one example of a conventional neighbor image processing device.

The memory blocks MB1 through MB9 are connected to data input/output terminals, and receive and transmit data according to addresses. FIG. 2 is a circuit diagram of a part of FIG. 1.

The address converter AD1, as shown in FIG. 2, comprises a ROM conversion table ROM1 which receives conversion mode data to supply a selected output; and two adders to which the output is applied. The remaining address converters AD2 through AD9 are identical in arrangement to the address converter AD1 described above. In the illustrated embodiment, each of the memory blocks MB1 through MB9 is a 512×512-bit RAM.

The operation of the above-described device will be described with reference to the 3×3-neighbor processing of a binary image. 9-bit data representing the 3×3-neighbors are processed according to the following procedure:

(1) Since a binary image can be represented by one bit, the same input is provided for all of the nine bits. As for the conversion mode, all the ROM conversion tables 1 through 9 output "0" for X- and Y-direction offsets, and the outputs thus provided are written in the same addresses in the memory blocks 1 through 9.

(2) In reading the image, the conversion mode is replaced by the writing mode of paragraph (1) above. As a result, the ROM conversion tables output different X- and Y-direction offsets, which are applied to the adders, to provide different addresses.

For instance, in reading the 3×3 neighbors, the X- and Y-direction offsets (m, n) are of nine different sets with m=−1, 0 and 1, and n=−1, 0 and 1.

As a result of the formation of these addresses, the binary image values for the 3×3 neighbors represented by nine bits can be simultaneously obtained from the nine memory blocks.

As described above, the neighbor image processing exclusive memory according to the invention comprises: a plurality of independent memory blocks and address converters provided respectively for the memory blocks, the address converters simultaneously or separately writing or reading an address externally applied thereto, or converting the address into different addresses or into an address partially the same with the aid of addresses capable of controlling an address conversion which is provided by external means coupled respectively to the memory blocks, so that the addresses are applied to the memory blocks simultaneously. Accordingly, employment of the neighbor image processing exclusive memory according to the invention results in significant improvements.

Various modifications and variations could be made in the invention without departing from the scope or spirit of the invention.

What is claimed is:

1. A neighbor image processing exclusive memory device, comprising:

data input/output means for supplying and receiving image data;

memory means, coupled to said data input/output means, for receiving, storing and transmitting neighbor image data via said data input/output means, individual segments of said data having corresponding addresses, wherein said memory means includes a plurality of independent memory blocks; and address conversion means, coupled to said memory means, for selectively reading, writing and converting said addresses in response to conversion mode signals received from an external source, said conversion means simultaneously supplying said addresses to said memory means for simultaneous access to individual segments of said neighbor image data in said memory means, said conversion means including an individual address converter corresponding to each memory block, a conversion table for receiving said conversion mode signal, and a pair of adders coupled to said conversion table for receiving the output thereof and for receiving said addresses corresponding to the data input into said memory means.

2. The processing device of claim 1 wherein each of said memory blocks comprises a 512×512-bit RAM.

* * * * *